United States Patent Office 3,521,984
Patented July 28, 1970

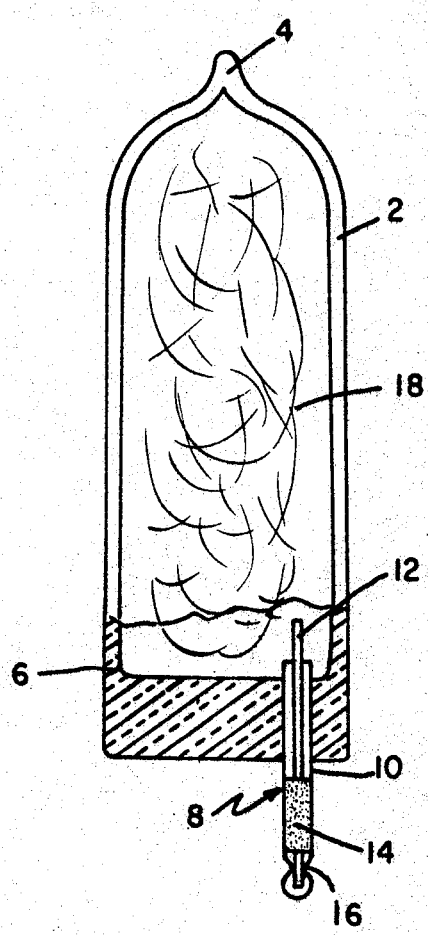
INVENTORS
JOHN W. SHAFFER
WILLIAM C. FINK

3,521,984
PHOTOFLASH LAMP
William C. Fink and John W. Shaffer, Williamsport, Pa., assignors to Sylvania Electric Products Inc., a corporation of Delaware
Filed Aug. 28, 1968, Ser. No. 756,027
Int. Cl. F21k 5/02
U.S. Cl. 431—93
7 Claims

ABSTRACT OF THE DISCLOSURE

A percusive-type photoflash lamp in which the powdered metallic combustible component of the fulminating material thereof comprises zirconium and boron.

---

This invention relates to the manufacture of photoflash lamps and more particularly those of the percussive type.

Generally speaking a percussive-type photoflash lamp comprises an hermetically sealed, light-transmitting envelope containing a source of actinic light and having a primer secured thereto. More particularly, the percussive-type photoflush lamp may comprise a length of glass tubing constricted to a tip at one end thereof and having a primer sealed therein at the other end thereof. The length of glass tubing which defines the lamp envelope contains a combustible such as shredded zirconium foil and a combustion-supporting gas such as oxygen. The primer may comprise a metal tube and a charge of fulminating material on a wire supported therein.

Operation of the percussive-type photoflash lamp is initiated by an impact onto the tube to cause deflagration of the fulminating material up through the tube to ignite the combustible disposed in the lamp envelope. Often the high velocity flow of gas resulting from deflagration of the fulminating material impinges on the shreaded combustible forming it into a compact mass located in the dome of the lamp. The combustion of such compacted shreds is very inefficient and the light output of the lamp does not attain its desired value.

Fulminating materials for percussive-type flashlamps usually comprise a mixture of red phosphorus, potassium chlorate, a powdered metallic combustible and a resin binder, such as nitrocellulose or hydroxyethyl cellulose for example. The ingredients that give rise to impact ignition sensitivity are the red phosphorus and potassium chlorate. Mixtures of red phosphorus and potassium chlorate react explosively when initiated by means of mechanical impact. The powdered metallic combustible does not take part in the initial stage of ignition by impact. It does, however, fulfill two very important functions; it dilutes and moderates the otherwise explosive nature of the phosphorus-chlorate reaction and serves to provide glowing particles which transport the combustion of the fulminating material through the lamp to the shredded metallic combustible.

It has been found that as the relative content of powdered metal in the fulminating material is increased, both the sensitivity toward impact ignition and the loudness and burning violence are decreased. However, a high impact sensitivity is essential for fulminating materials to be used in percussive-type photoflash lamps. On the other hand, highly sensitive materials that are deficient in powdered metal are disadvantageous in that they do not reliably ignite the shredded combustible and burn so violently as to cause tight compaction of the shreds. Combustion of such compacted shreds is very inefficient and thus the light output of the lamps is significantly affected adversely.

In view of the foregoing, one of the principal objects of this invention is to provide a fulminating material for percussive-type photoflash lamps that is highly sensitive to ignition by impact and which gives improved reliability of igniting the shredded combustible without causing excessive compaction thereof through violent, explosive deflagration.

The major metallic ingredient in the fulminating material of conventional electrically-ignited photoflash lamps is powdered zirconium. Thus powdered zirconium was first tried as the metallic ingredient for use in the fulminating material of percussive-type photoflash lamps. It was found, however, that zirconium-based fulminating materials either burned too violently, or were too insensitive toward impact, depending upon the relative quantity of powdered zirconium present. It was then found that powdered silicon, when substituted on a volume basis for the zirconium, provided a degree of combined impact sensitivity and moderate burning rate unattainable through the use of zirconium. It was also found that powdered boron gave a further degree of impact sensitivity and non-violent burning.

Despite the improvements attained in both impact sensitivity and moderate burning rate when silicon or boron was substituted for zirconium in the fulminating material of percussive-type photoflash lamps, we have found these materials to be inferior in one important aspect, viz., they do not promote as reliable ignition of the shredded metallic combustible as does the powdered zirconium. Such differences are particularly pronounced when the total weight of fulminating material within the flashlamp is minimized, as is desirable particularly in view of the shred compacting phenomena noted above.

However, we have found that a combination of boron and zirconium gives a fulminating material superior in overall properties to those attainable with either metal alone. Thus it is possible to both increase the shred ignition reliability and retain the sensitivity and burning characteristics of boron-based fulminating materials by replacing part of the boron with powdered zirconium. Zirconium burns at a considerably higher temperature than either silicon or boron and it may be this fact which makes zirconium more effective in igniting the shredded combustible.

In the accompanying drawing, the figure is an elevational view partly in section of a percussive-type photoflash lamp.

In the specific embodiment of the invention illustrated in the accompanying drawing, the percussive-type photoflash lamp illustrated therein comprises a length of glass tubing defining an hermetically sealed lamp envelope 2 constricted at one end to define an exhaust tip 4 and shaped to define a press 6 at the other end thereof. A primer 8 is sealed in the press 6. The primer 8 comprises a metal tube 10, a wire 12 and a charge of fulminating material 14.

The end of the tube 10 located outside the lamp envelope 2 is closed whereas the other end is open. The wire 12 is supported within the tube 10 by a crimp 16 near the outside end thereof. The charge of fulminating material 14 is located on that segment of the wire 12 which is located in the exposed segment of the tube 10. A combustible such as filamentary zirconium 18 and a combustion-supporting gas such as oxygen are disposed within the lamp envelope 2.

By way of specific example, a satisfactory fulminating material for use in percussive-type photoflash lamps in accordance with the principles of this invention may contain the following composition on a dried basis: powdered boron, 21.23%; powdered zirconium, 19.59%; red phosphorous, 28.71%; potassium chlorate, 28.71%; hydroxyethyl cellulose, 1.74%; and ortho phenyl phenol, 0.01%; Sufficient water is added to give a fulminating material of the desired viscosity to permit application to the anvil wire 12.

The foregoing composition represents a 3:1 volume ratio of boron to zirconium. At very low volume ratios, as for example 1:5, little if any of the advantage of boron remains, whereas at ratios higher than about 20:1 the quantity of zirconium present is of questionable value. The ratio of red phosphorus to potassium chlorate may be from 3:1 to 1:3; however, we prefer a ratio of 1. The weight percent of combined red phosphorous and potassium chlorate may be varied between about 10% and 90%; however, we prefer a value substantially as shown. A low content of red phosphorus and potassium chlorate results in poor impact sensitivity, whereas a high amount gives rise to an excessively explosive type of burning. The hydroxyethyl cellulose functions only passively as a binding agent and may constitute up to 5% by weight of the dried fulminating material.

What we claim is:

1. A photoflash lamp comprising:
   an hermetically sealed, light-transmitting envelope;
   a quantity of filamentary combustible material located within said envelope;
   a combustion-supporting gas in said envelope;
   and a primer secured to and extending from one end of said envelope and in communication therewith, said primer including a charge of fulminating material, the powdered metallic combustible of which comprises zirconium and boron.

2. The combination of claim 1 in which the fulminating material comprises a mixture of red phosphorus, potassium chlorate, powdered zirconium, powdered boron and a binding agent.

3. The combination of claim 2 in which the voluume ratio of boron to zirconium is about 3:1.

4. The combination of claim 2 in which the volume ratio of boron to zirconium is between about 1:5 to about 20:1.

5. The combination of claim 2 in which the ratio of red phosphorus to potassium chlorate is between about 3:1 to about 1:3.

6. The combination of claim 2 in which the weight percent of combined red phosphorus and potassium chlorate is between about 10% and about 90%.

7. The combination of claim 2 in which the binding agent comprises up to about 5% by weight of the dried fulminating material.

References Cited

UNITED STATES PATENTS 2,280,598  4/1942  Merdith _____ 431—95
2,285,125  6/1942  Pipkin _____ 431—95

EDWARD T. MICHAEL, Primary Examiner